United States Patent [19]

Perlowitz

[11] Patent Number: 5,319,538
[45] Date of Patent: Jun. 7, 1994

[54] SWITCH AND SYSTEM FOR RECONFIGURING A PLURALITY OF CLOSED LOOP SYSTEMS

[75] Inventor: William Perlowitz, Fairfax, Va.

[73] Assignee: Reliable Integration Services, Inc., Fairfax, Va.

[21] Appl. No.: 680,908

[22] Filed: Apr. 5, 1991

[51] Int. Cl.[5] .................. G05B 13/02; H04Q 3/00
[52] U.S. Cl. .......................... 364/148; 371/11.1; 340/825.05
[58] Field of Search ................ 307/112, 113, 116; 364/148, 183, 160; 371/11.1–11.3; 359/119; 370/16, 16.1; 340/825.05, 825.16

[56] References Cited

U.S. PATENT DOCUMENTS 3,875,390  4/1975  Eccles et al. .................. 371/11.2
4,236,202  11/1980  Giles et al. .................... 364/160
4,659,942  4/1987  Volp ............................... 307/112

OTHER PUBLICATIONS

Daystrom Systems, "An Approach to Nonlinear Adaptive Control" Taylor.
Integrated Electronics: Analog and Digital Circuits and Systems, Millman et al., McGraw-Hill, 1972, pp. 502–503.

Primary Examiner—Jerry Smith
Assistant Examiner—Steven R. Garland

[57] ABSTRACT

A switch reconfigures a plurality of closed loop systems by the introduction of an element or sub-closed loop system into the closed loop system while maintaining the closed loop format of the systems not receiving the element or sub-closed loop system. This switch includes an input and output associated with the element or sub-closed loop system and a plurality of input and output pairs, each pair being associated with a distinct closed loop system. The switch, in response to control signals, connects an input from one of the closed loop systems to the output associated with the element or sub-closed loop system. The switch also connects the input associated with the element or sub-closed loop system to the output associated with the input of the system. While making these connections, the switch also provides connections between the input and output pairs of the other closed loop systems not being connected to the element or sub-closed loop system so that these closed loop systems maintain their closed loop format and remain operative.

29 Claims, 6 Drawing Sheets

SWITCH AND SYSTEM FOR RECONFIGURING A PLURALITY OF CLOSED LOOP SYSTEMS

FIELD OF THE PRESENT INVENTION

The present invention is directed to a switch and a system for reconfiguring closed loop systems. More particularly, the present invention is directed to a switch and a system which is able to connect an element to one of a plurality of systems to form a closed loop system and at the same time close the loop format in the systems not being connected to the element.

BACKGROUND OF THE PRESENT INVENTION

In the conventional systems, if one desired to reconfigure a plurality of closed loop systems such that an element could be freely inserted or withdrawn from one of the plurality of closed loop systems, a person reconfiguring these closed loop systems would utilize one of two options.

The first option would require the person to physically disconnect and reconnect (recable) the cables or connections of the various closed loop systems so that the element could be introduced into one of the closed loop systems, and the other closed loop systems, not receiving the element, would maintain their closed loop format. This option required a large amount of time and effort in accomplishing the physical recabling of the various systems. Moreover, the large amount of recabling needed to realize the reconfiguration also promotes a higher chance of error.

The other option, that a person could utilize in the conventional systems to reconfigure a plurality of closed loop systems with the insertion or removal of an element, utilizes a switch which enables the insertion or removal of an element in conjunction with one of the plurality of closed loop systems. However, this switch does not allow the closed loop systems, not receiving the element, to remain operative because the switch does not provide a means to close the loop format of these closed loop systems. Thus, a person utilizing the second option is capable of switching a single element between a plurality of closed loop systems; however, the closed loop systems, not receiving the element, would become inoperative because when the switch removes the element from the closed loop system, the switch would leave the closed loop system in an open format, thereby rendering the system inoperative.

In summary, when utilizing the conventional system for reconfiguring closed loop systems, a person either has to exert a large amount of time and effort in recabling the closed loop systems in order to add or remove an element or the person can utilize a switch to accomplish the addition or removal operations but would lose the use of the closed loop systems, not receiving the element, because these systems would remain in an open format and thus inoperative. These various disadvantages with the conventional systems are overcome or substantially eliminated by the present invention.

OBJECTS OF THE PRESENT INVENTION

It is an object of the present invention is to provide a switch for reconfiguring closed loop systems in a simple and efficient manner.

It is another object of the present invention is to provide a system for reconfiguring closed loop systems utilizing a simple switch.

It is still another object of the present invention is to provide a system for reconfiguring closed loop systems which eliminates the need of physically recabling the closed loop systems when it is desired to reconfigure the closed loop system with the addition or removal of an element.

It is still a further object of the present invention to provide a switch which reconfigures a closed loop with the addition or removal of an element while maintaining the closed loop format in the systems not having the element added thereto.

It is still further another object of the present invention to provide a switch for connecting an element to one of a plurality of closed loop systems to form a closed loop system while closing the loop format in the closed loop systems not being connected to the element.

It is a further object of the present invention to provide a switch for reconfiguring closed loop systems such that a plurality of elements can be connected in any desirable fashion to a plurality of closed loop systems while the closed loop systems, not being connected to an element, maintain their closed loop format.

SUMMARY OF THE PRESENT INVENTION

These and other objects, as well as, advantages of the present invention will be realized from the detailed description of the various embodiments of the present invention given below.

One embodiment of the present invention which realizes the various advantages and objects discussed above is a system for reconfiguring closed loop systems having at least two processing systems constituting a plurality of devices connected in a loop format; an element capable of functioning in the processing systems; and a switching device, operatively connected to the processing systems in the element, for connecting the element to one of the processing systems to form a closed loop processing system and for closing the loop format in the processing systems not being connected to the element.

Another embodiment of the present invention, which also realizes the various advantages and objects discussed above, is a switch for reconfiguring a plurality of closed loop systems having an element input; an element output; a plurality of system inputs; a plurality of system outputs, each of the system inputs being associated with a distinct system output; and a control device for controlling the connectual relationship between the element input and output and the system inputs and outputs. The control device of this embodiment of the present invention also controls one of the system inputs to be connected to the element output and the element input to be connected to the system output associated with the system input connected to the element output. Lastly, the control device of this embodiment controls the other system inputs to be connected with the system outputs associated therewith.

A third embodiment of the present invention which realizes the various advantages and objects discussed above is a system for reconfiguring closed loop systems having at least two processing systems constituting a plurality of devices connected in a loop format; at least two elements capable of functioning in the processing systems; a switching device, operatively connected to the processing systems and the elements, for providing connections between the processing systems and the elements; and a control device, operatively connected to the switching device, for providing control signals to the switching device to dictate a configuration of the connections between the processing systems and the elements.

BRIEF DESCRIPTION OF THE DRAWINGS

Further scope and applicability of the present invention will become apparent from the detailed description given below. However, it should be understood that the detailed description and specific examples, while indicating preferred embodiments of the present invention, are given by way of illustration only, since various changes and modifications within the spirit and scope of the present invention will become apparent to those skilled in the art from this detailed description, wherein.

DETAILED DESCRIPTION OF THE DRAWINGS

A detailed description of each of the Figures will be given below. In these drawings, like items are given the same reference numerals throughout the Figures.

Figure 1:
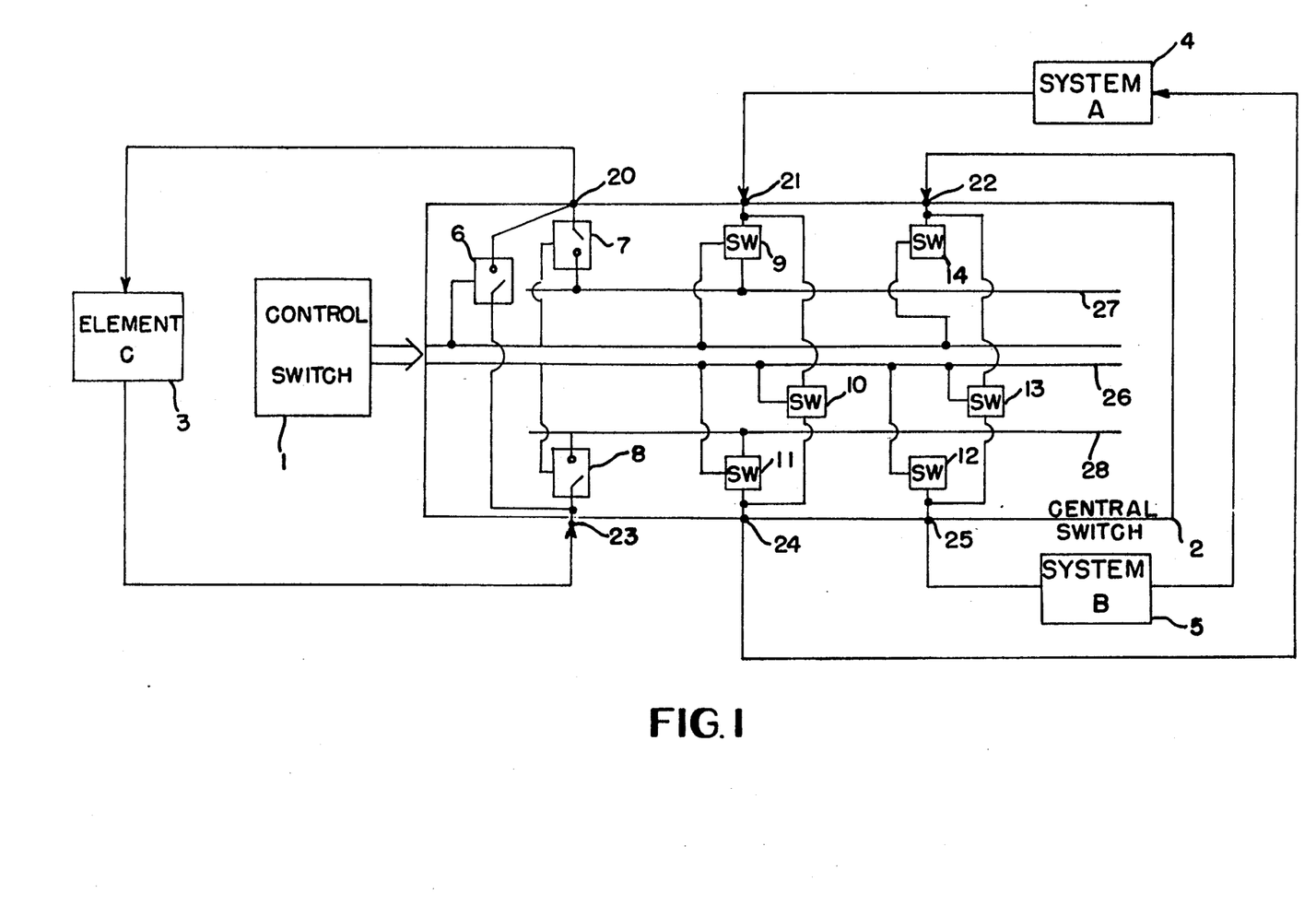
FIG. 1 shows a detailed illustration of one embodiment of the present invention.

FIG. 1 illustrates one embodiment of the present invention which utilizes a central switch 2 to reconfigure System A 4 and System B 5 with either the addition or removal of Element C 3. As illustrated in FIG. 1, the central switch 2 is controlled by a control switch 1. Element C 3 is connected to the central switch 2 at the input terminal 23 and the output terminal 20. System A 4 is also connected to the central switch 2 at the input terminal 21 and the output terminal 24 of central switch 2. Lastly, System B 5 is connected to central switch 2 at the output terminal 25 and the input terminal 22 of the central switch 2.

Central switch 2 contains two common communication paths 27 and 28. Central switch 2 also includes a control bus 26 which provides a communication path for the control signals received from the control switch 1. Lastly, central switch 2 includes a plurality of switches which provide connections between the various input terminals and output terminals, as well as, connections between the various terminals and the common communication paths 27 and 28.

Switch 6 provides a connection between output terminal 20 and input terminal 23 when the control switch 1 provides control signals which indicate that Element C 3 is not to be connected to any other system, and Element C 3 is to maintain its closed loop format. With respect to Element C 3, switches 7 and 8 are provided in the central switch 2 to enable connections between the input terminal 23 and the common communication path 28 and the output terminal 20 and the common communication path 27, respectively. These switches, 7 and 8, provide connections when the control switch provides control signals indicating that Element C 3 is to be connected to either System A 4 or System B 5. The actual operation of these switches will be discussed in more detail below in the section describing the actual operations of the present invention.

With respect to System A 4, central switch 2 includes a switch 10 which provides a connection between input terminal 21 and output terminal 24. This switch 10 is activated when the control signals from the control switch 1 indicate that System A 4 is to retain its closed loop format and is not to include Element C 3 within the actual closed loop format. Central switch 2 also includes switches 9 and 11 which provide connections between input terminal 21 and common communication path 27 and output terminal 24 and common communication path 28, respectively. Switches 9 and 11 are activated by the control signals from the control switch 1 which indicate that Element C 3 is to be included in the closed loop format of System A 4. A more detailed description of the operation of these switches will be given below in the section describing the actual operations of the present invention.

In providing connections for System B 5, the central switch 2 includes a switch 13 which provides a connection between input terminal 22 and output terminal 25. Switch 13 is activated when the control signals from control switch 1 indicate that System B 5 is to maintain its closed loop format without the addition of Element C 3. Central switch 2 also includes switches 14 and 12 which provide connections between input terminal 22 and common communication path 27 and output terminal 25 and common communication path 28, respectively. Switches 12 and 14 are activated when the control signals from control switch 1 indicate that System B 5 is to form a closed loop system with Element C 3. A more detailed description of the these switches will be given below in the section describing the actual operations of the present invention.

Figure 3:
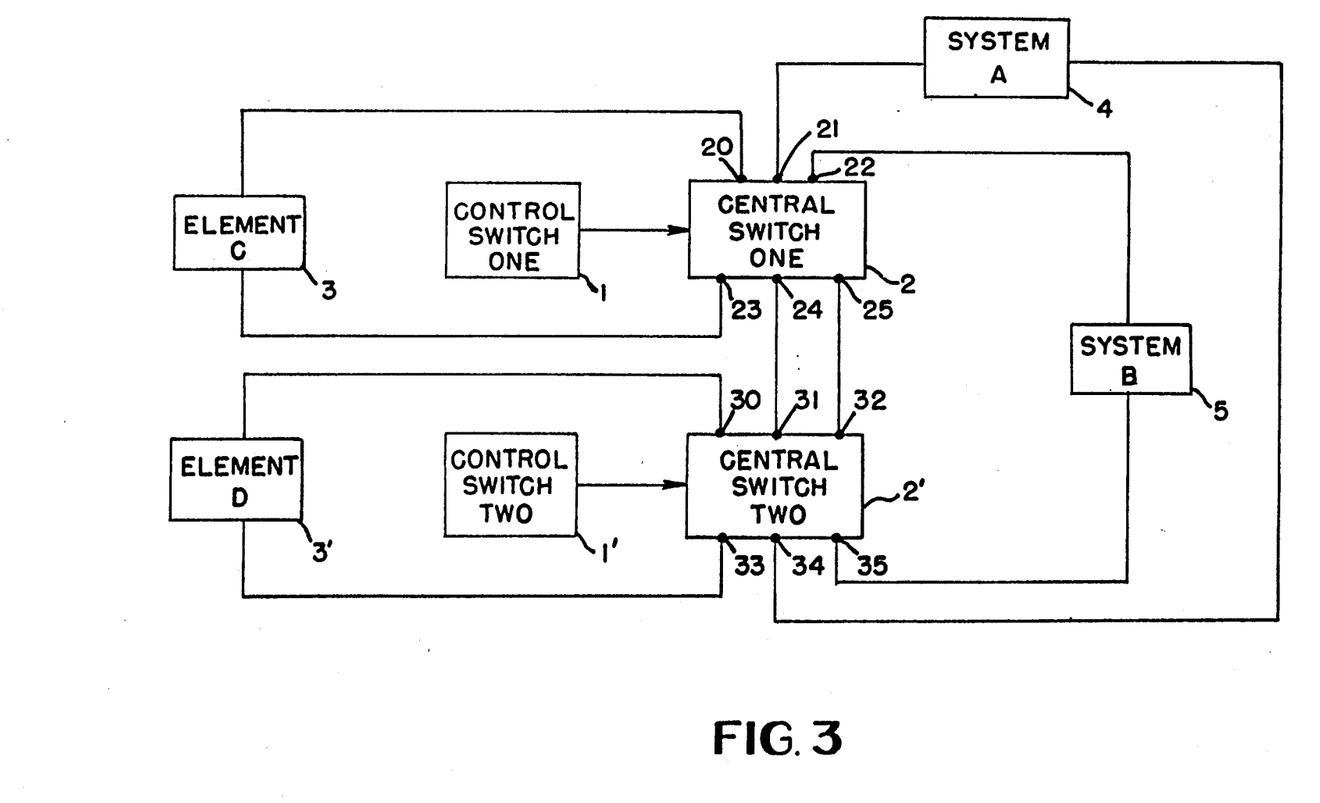
FIG. 3 shows another embodiment of the present invention utilizing a plurality of elements.

FIG. 3 illustrates another embodiment of the present invention which utilizes two central switches, 2 and 2', so that Element C 3 and Element D 3' can be utilized in the reconfiguration of System A 4 and System B 5. Central switch one 2 receives control signals from control switch one whereas central switch two 2' receives control signals from control switch two 1'. However, these two central switches, 2 and 2', can also receive control signals from a centralized control switch.

In FIG. 3, Element C 3 is connected to the central switch one 2 at output terminal 20 and input terminal 23. System A 4 is connected to central switch one 2 at input terminal 21, and System B 5 is connected to central switch one 2 at input terminal 22. Element D 3' is connected to the output terminal 30 of central switch two 2' and input terminal 33 of central switch two 2'. The output terminal 24 of central switch one 2 is connected to the input terminal 31 of central switch two 2', and the output terminal 25 of central switch one 2 is connected to the input terminal 32 of central switch two 2'. Lastly, System A 4 is connected to output terminal 34 of central switch two 2', and System B 5 is connected to output terminal 35 of central switch two 2'. This embodiment of the present invention enables a plurality of elements to be interconnected with a plurality of systems such that these closed loop systems can be reconfigured easily without destroying their closed loop format.

Figure 5:
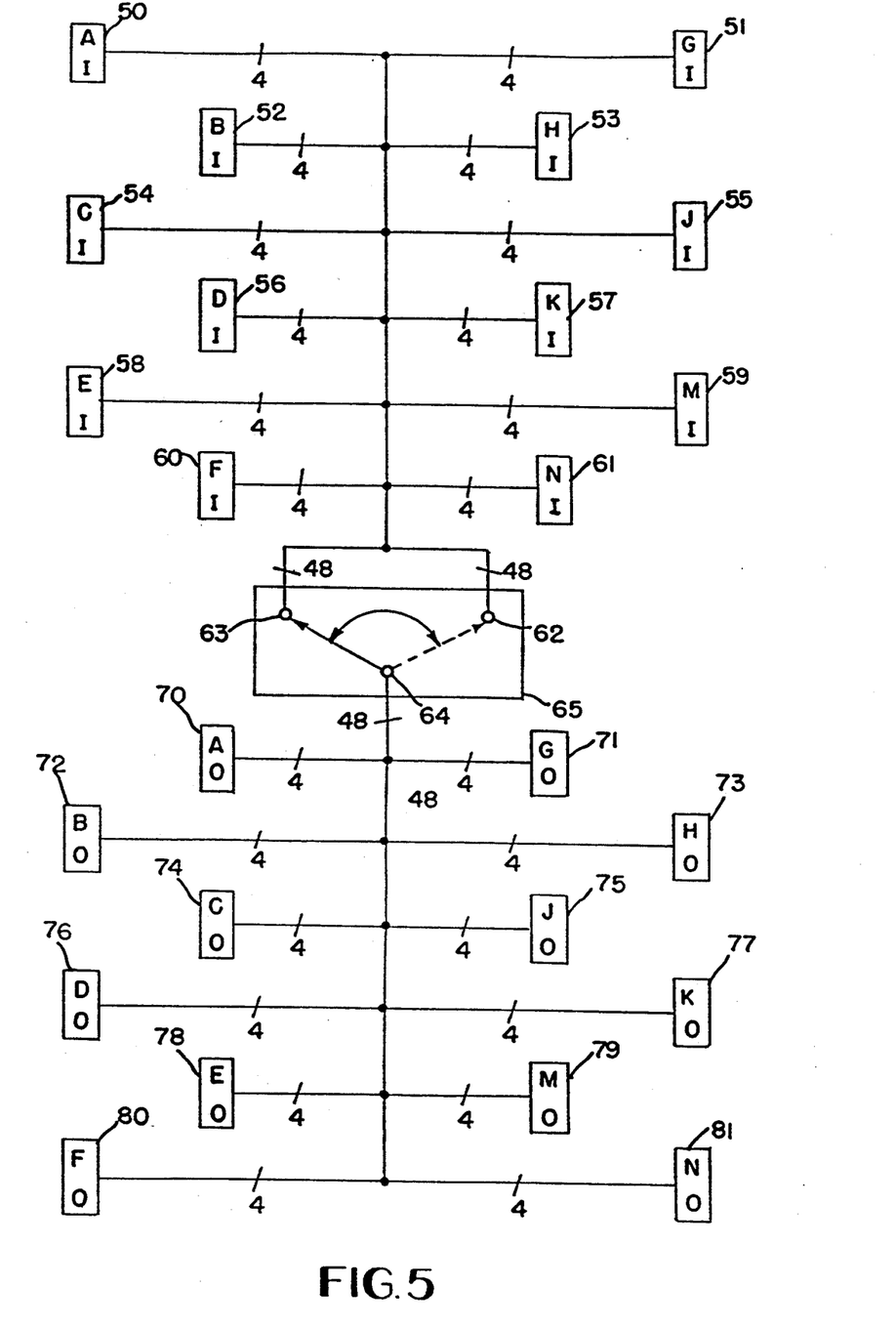
FIG. 5 shows a mechanical embodiment of the present invention.

FIG. 5 illustrates a mechanical embodiment of the present invention. In this embodiment, a mechanical switch 65 is used to switch between two situations. One situation involves an element being connected in a closed loop system with a first system while maintaining a second closed loop system in a closed loop format (when switch 65 is associated with terminal 63). The other situation (when switch 65 is associated with terminal 62) involves an element being connected in a closed loop system with the second closed loop system while maintaining the first closed loop system in a closed loop format.

In this illustration (FIG. 5), terminals AI(50), DI(56), GI(51), KI(57), AO(70), DO(76), GO(71) and KO(77) are input (I) and output (O) terminals associated with the first closed loop system. Terminals BI(52), EI(58), HI(53), MI(59), BO(72), EO(78), HO(73), and MO(79) are input (I) and output (O) terminals associated with the second closed loop system. Terminals CI(54), FI(60), JI(55), NI(61), CO(74), FO(80), JO(75), and NO(81) are input (I) and output (O) terminals associated with the elements to be inserted.

When switch 65 is associated with terminal 63, the following pairs of terminals are connected together: AI(50) and CO(74); BI(52) and BO(72); CI(54) and AO(70); DI(56) and FO(80); EI(58) and EO(78); FI(60) and DO(76); GI(51) and JO(75); HI(53) and HO(73); JI(55) and GO(71); KI(57) and NO(81); MI(59) and MO(79); and NI(61) and KO(77). An example of this scenario is illustrated by a simplified diagram in FIG. 2A.

When switch 65 is associated with terminal 62, the following pairs of terminals are connected together: AI(50) and AO(70); BI(52) and CO(74); CI(54) and BO(72); DI(56) and DO(76); EI(58) and FO(80); FI(60) and EO(78); GI(51) and GO(71); HI(53) and JO(75); JI(55) and HO(73); KI(57) and KO(77); MI(59) and NO(81); and NI(61) and MO(79). An example of this scenario is illustrated by a simplified diagram in FIG. 2B.

Figure 6:
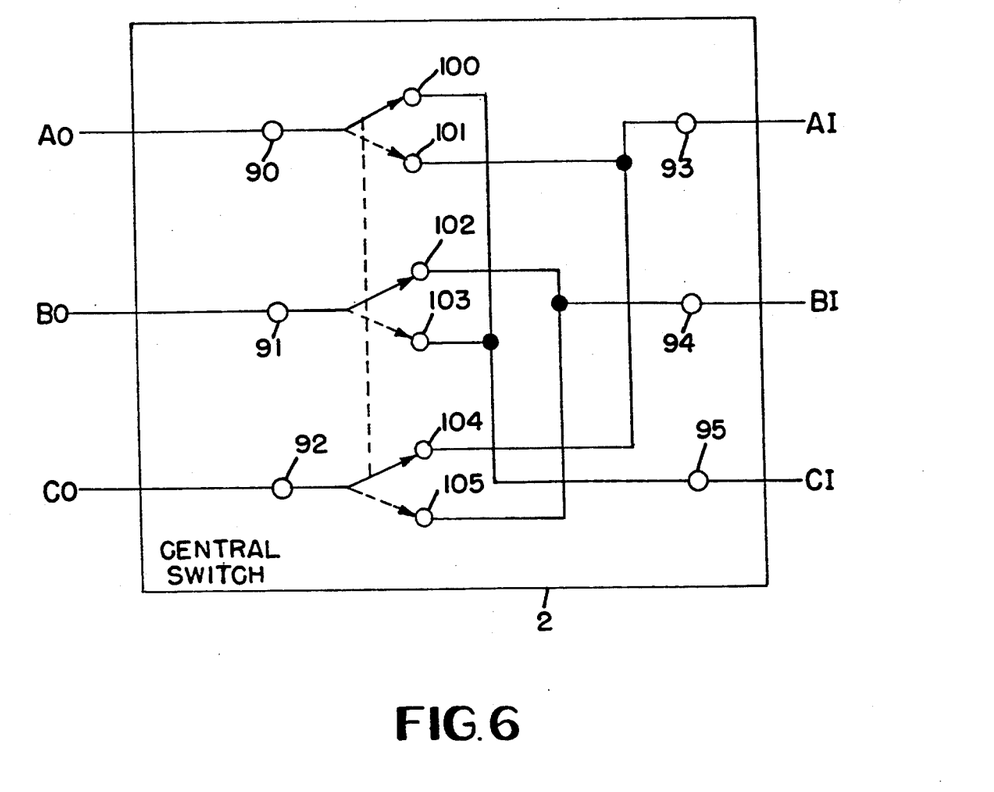
FIG. 6 shows a detailed diagram of the switching device of one mechanical embodiment of the present invention.

FIG. 6 illustrates another mechanical embodiment of the present invention. In this embodiment, a mechanical switch 110 is used for the central switch 2 to switch between two situations. One situation involves an element being connected in a closed loop system with a first system (A) while maintaining a second closed loop system (B) in a closed loop format (when switch 110 is associated with terminals 100, 102, and 104). The other situation (when switch 110 is associated with terminals 101, 103, and 105) involves an element being connected in a closed loop system with the second closed loop system (B) while maintaining the first closed loop system (A) in a closed loop format.

In this illustration (FIG. 6), terminals, AI(93) and AO(90), are input and output terminals, respectively, associated with the first closed loop system (A). Terminals, BI(94) and BO(91), are input and output terminals, respectively, associated with the second closed loop system (B). Terminals, CI(95) and CO(92), are input and output terminals, respectively, associated with the element to be inserted.

When switch 110 is associated with terminals 100, 102, and 104, the following pairs of terminals are connected together: AI(93) and CO(92); BI(94) and BO(91); and CI(95) and AO(90). An example of this scenario is illustrated by a simplified diagram in FIG. 2A.

When switch 110 is associated with terminals 101, 103, and 105, the following pairs of terminals are connected together: AI 93) and AO(90); BI(94) and CO(92); and CI(95) and BO(91). An example of this scenario is illustrated by a simplified diagram in FIG. 2B.

OPERATIONS OF THE PRESENT INVENTION

In describing the actual operations of the present invention, FIGS. 2A, 2B, 2C, 4A, and 4B will be utilized to assist the describing of the various operations and aspects of the present invention.

Figure 2A:
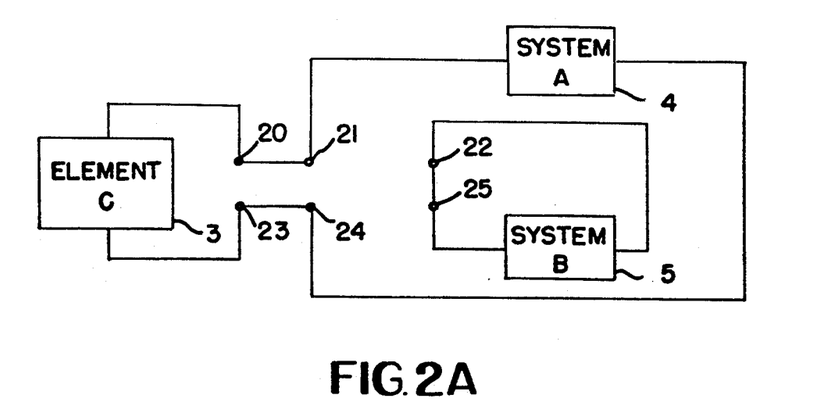
FIGS. 2A-2C show various connection schemes which can be realized utilizing the embodiment of FIG. 1.

FIG. 2A illustrates one possible connection scheme for the embodiment illustrated in FIG. 1. FIG. 2A shows the connection scheme when it is desired that Element C 3 be included in the closed loop process of System A 4. FIG. 2A also shows that although central switch 2 has provided the connection to enable the inclusion of Element C 3 in the closed loop process of System A 4, the closed loop format of System B 5 is still maintained. To realize this configuration, the input terminal 21 of central switch 2 is connected to the output terminal 20 of central switch 2. Also, the input terminal 23 of central switch 2 is connected to the output terminal 24 of central switch 2. To maintain the closed format of System B 5, the input terminal 22 of central switch 2 is connected to the output terminal 25 of central switch 2. More specifically, to realize these various connections, switches 7, 8, 9, 11, and 13 are activated by control signals received from control switch 1, and switches 6, 10, 12, and 14 are deactivated by control signals received by control switch 1. The activation and deactivation of these various switches enables the connection scheme illustrated in FIG. 2A.

Figure 2B:
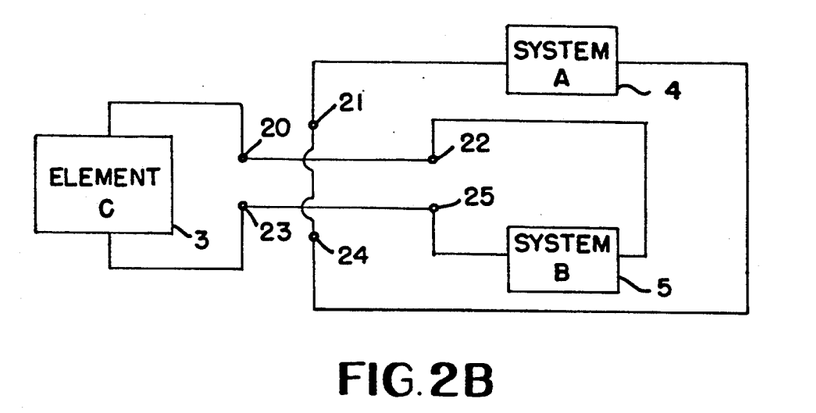

FIG. 2B illustrates another possible connection scheme for the embodiment illustrated in FIG. 1. FIG. 2B shows the connection scheme when it is desired that Element C 3 be included in the closed loop process of System B 5. FIG. 2B also shows that although central switch 2 has provided the connection to enable the inclusion of Element C 3 in the closed loop process of System B 5, the closed loop process of System A 4 is still maintained. To realize this configuration, the input terminal 22 of central switch 2 is connected to the output terminal 20 of central switch 2. Also, the input terminal 23 of central switch 2 is connected to the output terminal 25 of central switch 2. To maintain the closed format of System A 4, the input terminal 21 of central switch 2 is connected to the output terminal 24 of central switch 2. More specifically, to realize these various connections, switches 7, 8, 10, 12, and 14 are activated by control signals received from control switch 1. Moreover, switches 6, 9, 11, and 13 are deactivated by control signals received by control switch The activation and deactivation of these various switches enables the connection scheme illustrated in FIG. 2B.

Figure 2C:
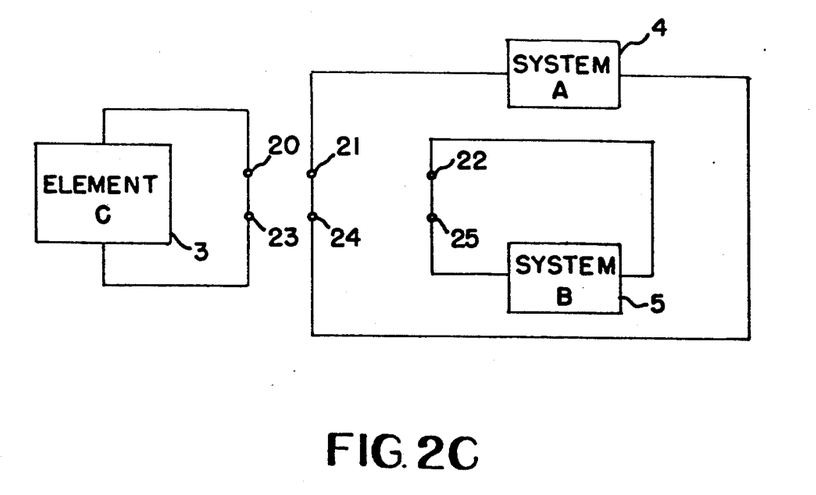

FIG. 2C illustrates a third connection scheme for the embodiment illustrated in FIG. 1 wherein Element C 3 is neither added to System A 4 nor System B 5, and System A 4 and System B 5 maintain their closed loop format. This connection scheme is constituted by connecting output terminal 20 of central switch 2 to input terminal 23 of central switch 2, connecting input terminal 21 of central switch 2 to output terminal 24 of central switch 2, and connecting input terminal 22 to output terminal 25 of central switch 2. More specifically, this configuration of the embodiment shown in FIG. 1 is accomplished by the activation of switches 6, 10, and 13 by control signals received from the control switch 1. Control switch also produces control signals which deactivate switches 7, 8, 9, 11, 12, and 14 of central switch 2. In this manner, the embodiment of FIG. 1 can maintain the closed loop format of System A 4 and System B 5 while also isolating Element C 3 from these systems.

Figure 4A:
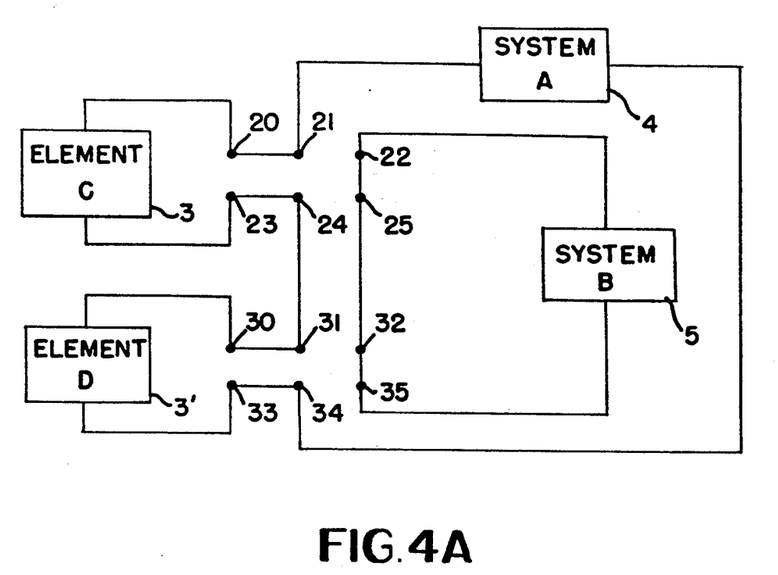
FIGS. 4A and 4B show just two of the various connection schemes that can be realized when utilizing the embodiment of FIG. 3.

FIG. 4A illustrates the situation where it is desired to connect Element C 3 and Element D 3' in a closed loop fashion with System A 4 while maintaining the closed loop format of System B 5. To accomplish this scenario, the input terminal 21 of central switch one 2 is connected to output terminal 20 of central switch one 2; input terminal 23 of central switch one 2 is connected to output terminal 24 of central switch one 2; input terminal 31 of central switch two 2' is connected to output terminal 30 of central switch two 2'; and input terminal 33 of central switch two 2' is connected to output terminal 34 of central switch two 2'. These connections provide a closed loop system which includes System A 4, Element C 3, and Element D 3'. To maintain the closed loop format of System B 5, input terminal 22 of central switch one 2 is connected to output terminal 25 of central switch one 2, and input terminal 32 of central switch two 2' is connected to output terminal 35 of central switch two 2'.

If the operator desired that Element C 3 and Element D 3' should be connected to System B 5 in a closed loop manner, the connections discussed above can be easily reconfigured to provide such a scenario. More specifically, in this scenario, input terminal 22 would be connected to output terminal 20; input terminal 23 would be connected to output terminal 25; input terminal 32 would be connected to output terminal 30; input terminal 33 would be connected to output terminal 35; input terminal 21 would be connected to output terminal 24; and input terminal 31 would be connected to output terminal 34. This would constitute a system wherein System A 4 maintains a closed loop format without the inclusion of Element C 3 or Element D 3', while a closed loop system is formed with System B 5, Element C 3, and Element D 3'.

Figure 4B:
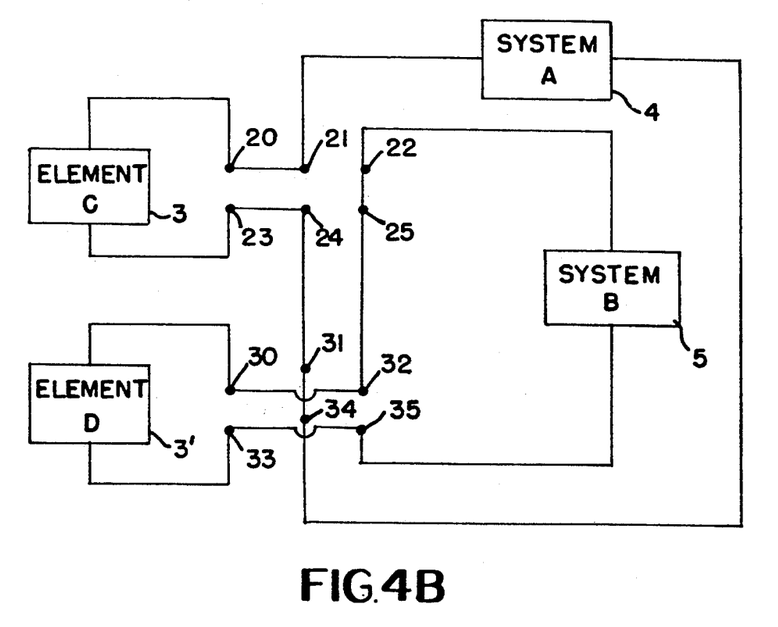

FIG. 4B illustrates a situation where a closed loop system is formed with System A 4 and Element C 3, and a closed loop system is formed with System B 5 and Element D 3'. To realize the first closed loop system of system A 4 and Element C 3, input terminal 21 is connected to output terminal 20; input terminal 23 is connected to output terminal 24; and input terminal 31 is connected to output terminal 34. To realize the second closed loop system of System B 5 and Element D 3', input terminal 22 is connected to output terminal 25; input terminal 32 is connected to output terminal 30; and input terminal 33 is connected to output terminal 35.

As discussed above, this embodiment of the present invention can also realize a reconfiguration wherein System B 5 is associated with Element C 3 and System A 4 is associated with Element D 3'. In this scenario, input terminal 21 is connected to output terminal 24; input terminal 31 is connected to output terminal 30; input terminal 33 is connected to output terminal 34; input terminal 22 is connected to output terminal 20; input terminal 23 is connected to output terminal 25; and input terminal 32 is connected to output terminal 35.

Lastly, as discussed above with respect to FIG. 2C and FIG. 1, the embodiment illustrated in FIG. 3 can also realize a configuration wherein System A 4 and System B 5 are closed loop systems which do not include Element C 3 or Element D 3'. In this situation, input terminal 23 would be connected to output terminal 20; input terminal 21 would be connected to output terminal 24; input terminal 22 would be connected to output terminal 25; input terminal 33 would be connected to output terminal 30; input terminal 31 would be connected to output terminal 34; and input terminal 32 would be connected to output terminal 35. This would allow the isolation of System A 4 and System B 5 without the inclusion of Element C 3 or the inclusion of Element D 3'.

Although FIGS. 1 and 3 illustrate only two systems connected to the central switch, the capacity of the central switch can be expanded to include n number of systems such that Element C 3 or Element D 3' can be interchanged with any of a plurality of systems. This expansion is also applicable to the mechanical switches illustrated in FIGS. 5 and 6. This expansion can be realized by merely adding additional terminals with the corresponding switches. These switches will be controlled in the same manner as described above with respect to switches 9, 10, and 11, for example. Thus, the contemplated embodiments of the present invention are not limited to the reconfiguration of two systems, but the concepts of the present invention can be utilized to reconfigure more than two systems.

In FIG. 3, the connections between terminals 24 and 31 and terminals 25 and 36 can be realized by one of the following. These terminals can be connected by jumper cables. These terminals can also be connected such that a device is connected in series between the terminals. Lastly, these terminals can be connected such that a plurality of devices which are connected in a loop format are connected in series between the terminals. Thus, these terminals need not be connected with just jumper cables.

With respect to Element C 3 and Element D 3', these elements can be either a single device, i.e., a single processor, or may be a separate closed loop system which includes a plurality of processing units.

Moreover, the present invention is not just applicable to processing systems but may be applicable to any system wherein the primary feature or characteristic of the system is a circular or loop flow. For example, the present invention can be applicable to local access networks, token rings, fiber optic dual rings, closed loop water systems, closed loop manufacturing processes, automated closed loop manufacturing processes, or any other process which requires a closed loop.

The present invention is also applicable to any system which requires the merging or isolating of rings by simply utilizing a central switch.

Moreover, although the central control switch has been illustrated as being a simple switch which provides control signals to the central switch, this central control switch may be a mechanical switch which includes a plurality of input switches that allows the operator to physically input the desired configuration, or the control switch may be a master central processing unit which uses electrical or optical signals to control the overall system. The actual switches within the central switch 2 may be mechanical, electrical, or optical.

Lastly, although FIG. 3 illustrates only two elements and two central switches to be utilized in reconfiguring the closed loop systems of System A and System B, the present invention also can be used with more than two elements, as well as, used with more than two central switches such that a large number of different scenarios can be realized when reconfiguring the various closed loop systems.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A system for selectively configuring closed-loop systems comprising:
   at least two processing systems, each of said processing systems including at least one system device connected in a loop format;
   an element capable of functioning in each of said processing systems; and
   switch means, operatively connected to said processing systems and said element, for selectively connecting said element to any one of said processing systems to form a closed loop processing system and for closing the loop format in said processing systems not being connected to said element.

2. The system as claimed in claim 1 wherein said element is a single element device.

3. The system as claimed in claim 2 wherein said element device is a computer processor.

4. The system as claimed in claim 1 wherein said element is a processing system having a plurality of element devices connected in a loop format.

5. The system as claimed in claim 4 wherein said element devices are computer processors.

6. The system as claimed in claim 1 wherein said switch means is an electrical switch.

7. The system as claimed in claim 1 wherein said switch means is an optical switch.

8. The system as claimed in claim 1 wherein said switch means is a mechanical switch.

9. The system as claimed in claim 1 wherein said element and said switch means form an integral device.

10. A system for selectively configuring closed-loop systems comprising:
    at least two processing systems, each of said processing systems including at least one device connected in a loop format;
    an element capable of functioning in each of said processing systems; and
    switch means, operatively connecting said processing systems and said element, for closing the loop format in each of said processing systems and for selectively connecting said element in a closed loop such that said element is not connected to any of said processing systems.

11. The system as claimed in claim 10 wherein said element is a processing system having a plurality of devices connected in a loop format.

12. A switching system for selectively configuring connections between a plurality of terminals connected with a plurality of closed loop systems comprising:
    a plurality of switches;
    an element input terminal;
    an element output terminal;
    a plurality of system input terminals;
    a plurality of system output terminals, each of said system input terminals being associated with a distinct system output terminal, each system input terminal and associated system output terminal being connected to a single closed loop system; and
    control means for controlling said plurality of switches to form a connectual relationship between said element input terminal, said element output terminal, said system input terminals, and said system output terminals;
    said control means controlling said plurality of switches such that one of said system input terminals is connected to said element output terminal and said element input terminal is connected to said system output terminal associated with said one of said system input terminal;
    said control means controlling said plurality of switches such that the other said system input terminals are connected to said system output terminals associated therewith.

13. The switching system as claimed in claim 12 wherein said plurality of switches are electrical switches.

14. The switching system as claimed in claim 12 wherein said plurality of switches are optical switches.

15. The switching system as claimed in claim 12 wherein said plurality of switches are mechanical switches.

16. The switching system as claimed in claim 12 further comprising:
    a first common communication path operatively connected to said element output terminal and said system input terminals; and
    a second common communication path operatively connected to said element input terminal and said system output terminals;
    said plurality of switches including,
        a first switch for connecting said element output terminal and one of said system input terminals to said first common communication path,
        a second switch for connecting said element input terminal and said system output terminal associated with said one of said system terminals to said second common communication path, and
        third switch means for connecting the other said system input terminals to said system output terminals associated therewith.

17. The switching system as claimed in claim 12, wherein said control means, in a different mode, controls said plurality of switches to connect said element input terminal to said element output terminal and to connect each system input terminal with the system output terminal associated therewith.

18. A system for selectively configuring systems having closed loop formats comprising:
    at least two processing systems, each processing system including at least one system device connected in a closed loop format such that a said system device is only connected in one processing system;
    at least two elements, each of said elements capable of functioning in any of said processing systems;
    switch means, operatively connected to said processing systems and said elements, for providing connections between said processing systems and said elements; and
    control means, operatively connected to said switch means, for providing control signals to said switch means to dictate a configuration of said connections between said processing systems and said elements;
    said switch means, under control of said control signals from said control means, selectively switching each of said elements into one of said processing systems while maintaining each said processing system's loop format, said processing systems without an element switched therein also maintaining their loop format.

19. The system as claimed in claim 18 wherein each element is a single element device.

20. The system as claimed in claim 19 wherein said element device is a computer processor.

21. The system as claimed in claim 18 wherein each element is a processing system having a plurality of element devices connected in a loop format.

22. The system as claimed in claim 21 wherein said element devices are computer processors.

23. The system as claimed in claim 18 wherein said switch means, in response to said control signals, connects at least one element to one of said processing systems and provides a connection for each processing system not being connected to an element to close the loop format in said processing systems.

24. The system as claimed in claim 18 wherein said switch means, in response to said control signals, connects each single element to different processing systems and provides a connection for each processing system not being connected to an element to close the loop in said processing systems.

25. The system as claimed in claim 18 wherein said switch means is an electrical switch.

26. The system as claimed in claim 18 wherein said switch means is an optical switch.

27. The system as claimed in claim 18 wherein said witch means is a mechanical switch.

28. The system as claimed in claim 18 wherein said control means is a mechanical device.

29. The system as claimed in claim 18 wherein said control means is a central processing unit.

* * * * *